C. S. KELLOGG.
SPEED AND POWER TRANSMITTING MECHANISM.
APPLICATION FILED FEB. 13, 1908.

1,080,282.

Patented Dec. 2, 1913.
4 SHEETS—SHEET 1.

WITNESSES
H. C. Abbott
M. C. Powell

INVENTOR
Charles S. Kellogg
BY Griffin & Bernhard
ATTORNEYS

C. S. KELLOGG.
SPEED AND POWER TRANSMITTING MECHANISM.
APPLICATION FILED FEB. 13, 1908.

1,080,282.

Patented Dec. 2, 1913.

WITNESSES
H. C. Abbott
M. C. Powell

INVENTOR
Charles S. Kellogg
BY Griffin & Bernhard
ATTORNEYS

UNITED STATES PATENT OFFICE.

CHARLES SNOW KELLOGG, OF MONTCLAIR, NEW JERSEY.

SPEED AND POWER TRANSMITTING MECHANISM.

1,080,282. Specification of Letters Patent. Patented Dec. 2, 1913.

Application filed February 13, 1908. Serial No. 415,691.

*To all whom it may concern:*

Be it known that I, CHARLES SNOW KELLOGG, a citizen of the United States, residing in Montclair, county of Essex, and State of New Jersey, have invented a new and useful Speed and Power Transmitting Mechanism, of which the following is a specification.

This invention belongs to that class of mechanism for transmitting power and speed, and for controlling such transmission, between a driving and driven member.

The invention is adapted, further, to act as a brake on either the driving or driven members, to produce a free slip of either of said members, to produce either a direct or reverse rotation of the driven member with respect to the driving member, or to permit reverse rotation of the driving member without varying the direction of rotation of the driven member.

A liquid, such as water or oil, is employed as the medium for communicating motion from one part to another, and, also, as the medium for operating a hydrostatic brake device.

The mechanism is capable of use in the several arts where it is desired to communicate motion, speed, or power, from one part or element to another part or element, but it is particularly adapted for use on traction vehicles, such as automobiles. I shall hereinafter describe the invention as used in connection with an automobile, but it is to be understood that I do not restrict myself to its use in this particular field.

The mechanism, generally stated, embodies a rotatable chambered member or element, hereinafter termed a "casing," a pump, or plurality of pumps, coöperating with said casing and the driving member, and a pump, or plurality of pumps, coöperating, also, with the casing and with the driven member, and passages for liquid coöperating with the casing and the aforesaid pumps.

In a further embodiment of the invention there is employed hydrostatic and mechanical means for controlling, regulating, or restraining the rotation of the casing, and, also, for controlling, regulating, or restraining, the relative rotation of the casing with relation to the driving and driven members, individually or severally.

The pump or pumps coöperating with the driven member and the casing operate to pump liquid when there is a variation in direction, speed, or existence of rotation, between said driving member and said casing; and the pump or pumps coöperating with the driving member and the casing cannot operate to pump liquid, nor can said pump or pumps be operated by the liquid, to secure direct drive, unless there exists a variation in direction, speed, or existence of rotation, between said driving member and said casing.

In the preferred form of the invention a pump of that type is employed wherein the pumping capacity may be regulated or varied, and the discharge and intake reversed, although it will be obvious that pumps not possessing the foregoing functions may be employed, and the reversal of the intake and discharge accomplished by any well known valve mechanism.

The specific type of pumps which I contemplate using are of the reciprocating piston variety, each pump having a plurality of piston chambers in which reciprocating pistons operate, the pistons of each pump traveling in contact with a cam or an abutment. The piston chambers of one pump (or pumps) connect, by suitable liquid passages, with the piston chambers of the other pump (or pumps) in such manner that the liquid is forced by the operation of one set of pistons to act on the other set of pistons so as to drive the latter, the liquid being returned to the piston chambers of the driving pump by suction established therein on the reverse stroke of the pistons, whereby the liquid is alternately forced and exhausted by one pump for the operation of the other pump, the liquid being circulated repeatedly through the pump chambers and the connecting passages.

The flow of liquid between the pumps is controlled, permitted, or stopped, by the simple operation of a valve mechanism which may be adjusted at will, regardless of whether the casing is at rest or in motion; and, furthermore, said valve mechanism is adapted to regulate the quantity of liquid permitted to circulate between the pumps, thus affording one means for changing the speed ratio of the two pumps with respect to the automobile, or ground, and, consequently, of the driving and driven shafts. Furthermore, it is preferred (although not essential) to make the cam or abutment of either or both pumps adjustable to different positions relative to the plane of the pump cylinders, whereby the stroke of the pistons may be varied, either on direct or backward drive, from full stroke to *nil*. The capacity of the pump or pumps may thus be changed to vary the relative speeds of the driving and driven shafts, and, also, to start and stop the apparatus, although the start and stop may be secured, also, by opening and closing the valve controlling the flow of liquid through the circuit.

The adjustment of the pump cam or abutment may be secured by mechanically operated means or by fluid pressure mechanism, it being preferred, under some circumstances, to utilize the latter mechanism. The liquid in said pressure mechanism is forced by the operation of the pump to act on pistons which operate to change the position of the cam or abutment, the direction of flow of the liquid being controlled by an appropriate valve. With said liquid cam-adjusting mechanism is associated a regulator adapted to secure a normal flow of the liquid in one direction only, irrespective of the direction in which the driving pump is operating, and, also, irrespective of the relative speed of the engine and car.

The employment of a fluid operated transmitting apparatus in connection with an automobile of that class which is driven by an internal combustion engine gives rise to certain practical difficulties owing, mainly, to the facts that the engine shaft runs constantly in one direction, at a speed which may be either uniform or variable; that it is necessary to propel the driven shaft of the automobile at varying speeds relative to that of the engine shaft; to start and stop the driven shaft at will, the latter running under either high or slow speed, while permitting the engine shaft to run at its normal speed; to secure a direct drive of the car from the engine shaft by coupling the driven shaft to said engine shaft for rotation as a unit; and to reverse the direction of rotation of the driven shaft relative to the engine shaft, and to act as a brake upon the driven shaft, and hence the car. These conditions, among others, are accomplished by my invention.

As heretofore stated, briefly, the invention embodies means for holding the casing against rotation, said means being in the form, either, of a manually operated brake or clutch, or an automatic brake or clutch; it being preferred, however, to employ both forms of brakes or clutches. I further contemplate the employment of means for mechanically connecting the casing to the driving or driven shafts, or both, or means for directly coupling the two shafts, whereby the entire apparatus is adapted to rotate with the shafts on direct drive without internal relative motion. Any one or more of said coupling devices may be employed.

In the accompanying drawings, I have illustrated different practical embodiments of the invention, but the constructions shown therein are to be understood as illustrative, only, and not as defining the limits of the invention.

A, B, designate two shafts which are shown as terminating quite close to each other and as being arranged in alinement, although the particular relation of the two shafts is not material. For convenience I will hereinafter designate the shaft, A, as the driving shaft or the driving element, whereas the shaft, B, will be termed the driven shaft or driven element.

C designates a hollow member hereinbefore and hereinafter termed the casing. Said casing consists of two hollow parts, $c$, $c'$, and a head, $c^2$. The parts composing the casing are shown as being assembled in coaxial relation, with the head, $c^2$, between the hollow sections $c$, $c'$, it being preferred to provide said hollow sections and the head with flanges, $c^3$, through which flanges are passed the bolts, $c^4$, whereby the hollow sections and the head are united into a single structure. The hollow sections, $c$, $c'$, are closed at their ends distant from the intermediate head, $c^2$, and said closed end portions of the hollow sections are provided with sleeves or bearings, $c^5$, adapted to fit loosely on the shafts, A, B, whereby the entire casing, C, is mounted in co-axial relation to the shafts, A, B, and said casing is loose or rotatable with respect to both of the shafts and the machine or other apparatus in connection with which the transmission mechanism is used.

The hollow sections, $c$, $c'$, of the casing, C, form chambers, $d$, $d'$, on the respective sides of the intermediate head, $c^2$, and these chambers accommodate pumps indicated generally by the reference characters, D, E. As shown, the pump, D, is operated by the driving shaft, A, so that it may be termed the driving pump, whereas the other pump, E, is combined with the driven shaft, B, for the purpose of propelling said shaft, B, the two pumps being so related that the pump, E, is operated by the fluid forced into its piston chambers by the pump, D, or vice versa when braking.

The intermediate head, $c^2$, of the rotatable casing, C, is constructed to support for rotation the pump chambers for the two pumps, D, E, a liquid circuit connecting said pump chambers in a peculiar manner, and a valve mechanism adapted to control the circulation of fluid from one pump to the other and through the liquid circuit; said head, $c^2$, also loosely receiving the inner adjacent ends of the driving and driven shafts, A, B, respectively.

Within the chamber, D, and in engagement with one face or side of the head, $c^2$, is a pump barrel, $d^2$, the latter being made fast with the shaft, A, by suitable means, such as the key or feather, $d^8$. Said pump barrel is provided with a series of piston chambers, $d^3$, which are provided with ports, indicated at $d^5$, $d^6$, $d^7$, and in the chambers, $d^3$, of said pump barrel operate the reciprocating pistons, $d^4$, the latter being connected by the pitmen 10 to the rotating member 11. Said member is connected by a universal joint presently described to the shaft, A, and as the pump barrel, $d^2$, and the member 11 are both connected to the shaft, A, said parts are adapted to rotate with said shaft, thus keeping the chambers, $d^3$, of the rotatory barrel in predetermined relation to the rotatory member 11 for the proper operation of the pistons.

Figure 5:
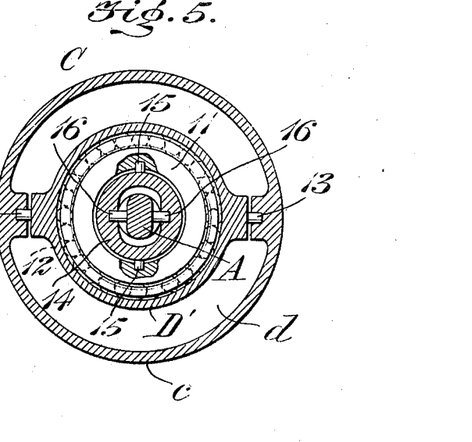
Fig. 5 is a vertical cross section illustrating the means for mounting the pump cam or abutment in the rotatory casing.

The ports, $d^5$, $d^6$, $d^7$, of the rotatory pump barrel, $d^2$, are adapted to register successively with the channels 17, 18 of a liquid circuit which is provided in the head, $c^2$, between the two sets of piston chambers of the pumps, D, E, one of the ports, such as $d^7$, being in an idle or cut-off relation to the channels of the liquid circuit. Said member is shown as having ball bearing engagement 12 with a pump cam or abutment, D', the latter losely encircling the shaft, A, and mounted so as to be shiftable with relation to said shaft and to the plane of the pump pistons, $d^4$. The pump cam or abutment, D', is provided with trunnions 13 which are mounted in the opposite side portions of the section, $c$, forming a part of the rotatory casing, C, see Fig. 5. The pump cam or abutment, D', normally occupies a fixed predetermined relation to the casing, C, although said pump cam is adapted to be moved on its pivots 13 to different inclined positions, or to a position perpendicular to the driving shaft, A, and, furthermore, said pump cam is supported in the casing, C, for rotation therewith. The rotary member 11 is so connected to the pump cam, D', that it normally remains in engagement therewith, and this member 11 is connected by a universal joint to the driving shaft, A. The universal joint is composed of a ring 14 normally lying within the rotating member 11, and this ring is connected by trunnions 15 to said member 11 and by other trunnions 16 to the shaft, A, said trunnions 16 being at right angles to the trunnions 15, as shown in Fig. 5, whereby the universal joint serves to operatively connect the rotating member 11 to the driving shaft, A, for positive rotation therewith.

The pump chambers, $d^3$, open into the ports, $d^5$, $d^6$, $d^7$, and of these several ports, the ports, $d^5$, are shown as communicating with a channel 17 which is provided in the head, $c^2$, of the casing. The other ports, $d^6$, of certain pump chambers, $d^3$, are shown as communicating with another channel 18 also formed in the head, $c^2$, the two channels 17, 18 being of the curved form shown in Fig. 2, and located on opposite sides of the shafts, A, B, but the relation of the ports to the channel changes constantly on the rotation of the pump.

Figure 6:
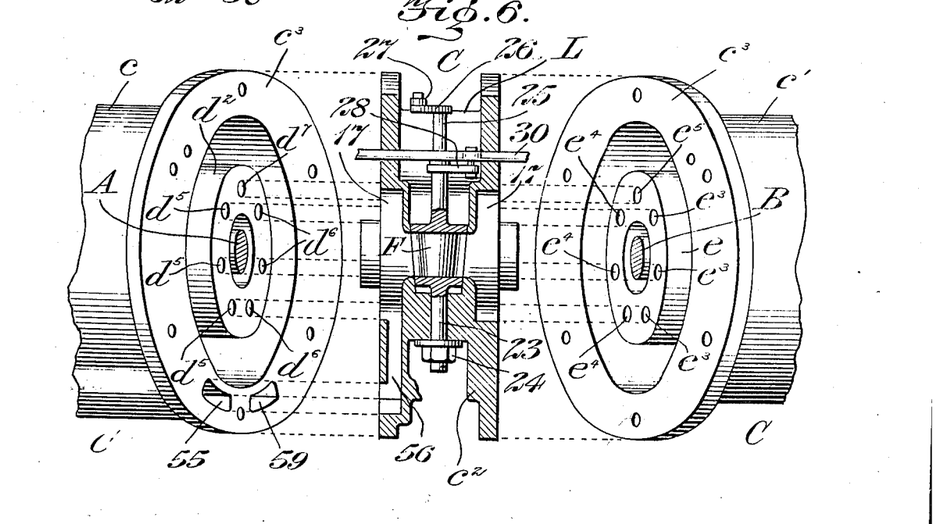
Fig. 6 is a view, partly in vertical section and partly in perspective, showing the relation of the valve mechanism to the rotatory casing and the two sets of cylinders of the driving and driven pumps.

In the chamber, $d'$, of the casing, C, is arranged a pump barrel, $e$, forming a part of the driven pump, E, said barrel being made fast by a key or feather, $e^8$, with the driven shaft, B. Said pump barrel, $e$, is normally in engagement with that face or side of the head, $c^2$, opposite to the pump barrel, $d^2$, whereby the two pump barrels engage with the respective surfaces of the head, $c^2$, so as to be normally in fluid tight connection therewith. The barrel, $e$, of the driven pump is provided with a series of piston chambers, $e'$, having the ports, $e^3$, $e^4$, $e^5$, the latter being adapted to register with the channels 17, 18 of the liquid circuit in the head, $c^2$, whereby the fluid forced from certain cylinders, $d^3$, of the driven pump, D, may enter certain cylinders, $e'$, of the driven pump while at the same time the fluid may be exhausted from other cylinders, $e'$, of the driven pump into other cylinders of the driving pump. The pistons, $c^2$, are provided with pitmen 19 which are pivoted to a rotating member 20 of a cam or abutment 21, the latter being fitted loosely on the driven shaft, B. The rotating member 20 is connected by a universal joint 22 to the driven shaft, B, for the purpose of communicating the motion of the pistons, $c^2$, to said shaft, B. The abutment 21 is pivotally mounted in the section, $c'$, of the casing, C, in a similar way to the abutment, D', of the pump, D, and the member 20 of the pump, E, is connected to the abutment 21 and to the shaft, B, similarly to the connection of the member 11 to the abutment, D', of the first named pump, D. The cylinders, $e'$, of the driven pump terminate in ports, $e^3$, $e^4$, $e^5$, see Fig. 6. The ports, $e^3$, of a number of cylinders are shown as communicating with the channel 17; the ports, $e^4$, of another number of cylinders, $e'$, communicating with the other channel 18, and the port, $e^5$, is opposite to the port, $e^7$, all as shown in Fig. 6, the relation of the ports to the channels 17, 18 being changed on the rotation of the pump.

From the foregoing, it will be noted that the apparatus is provided with a pump operated by the driving shaft and, furthermore, with another pump coöperating with the driven shaft for the purpose of imparting motion thereto. The pistons, $d^4$, of the pump, D, are reciprocated in the chambers, $d^2$, by the member 11 rotating with the shaft, A, said member 11 being operated by the cam or abutment, D', so as to impart the desired reciprocating motion to the piston, $d^4$. During each rotation of the element 11, the series of pistons are moved back and forth in the chambers, and on the out stroke of certain pistons, $d^4$, the fluid is forced through the passage 17 into certain chambers, $e'$, of the driven pump, E, and simultaneously with this operation the fluid is exhausted from other chambers of the pump, E, and drawn into the corresponding chambers of the pump, D, whereby the fluid is caused to circulate back and forth between the chambers of the two pumps. The pump, D, being positively operated by the driving shaft, A, the fluid is forced under pressure against the pistons of the pump, E, and the motion of the pistons is communicated by the rotating member 20 to the shaft, B, for the purpose of driving the latter.

Figures 1, 2, 3:
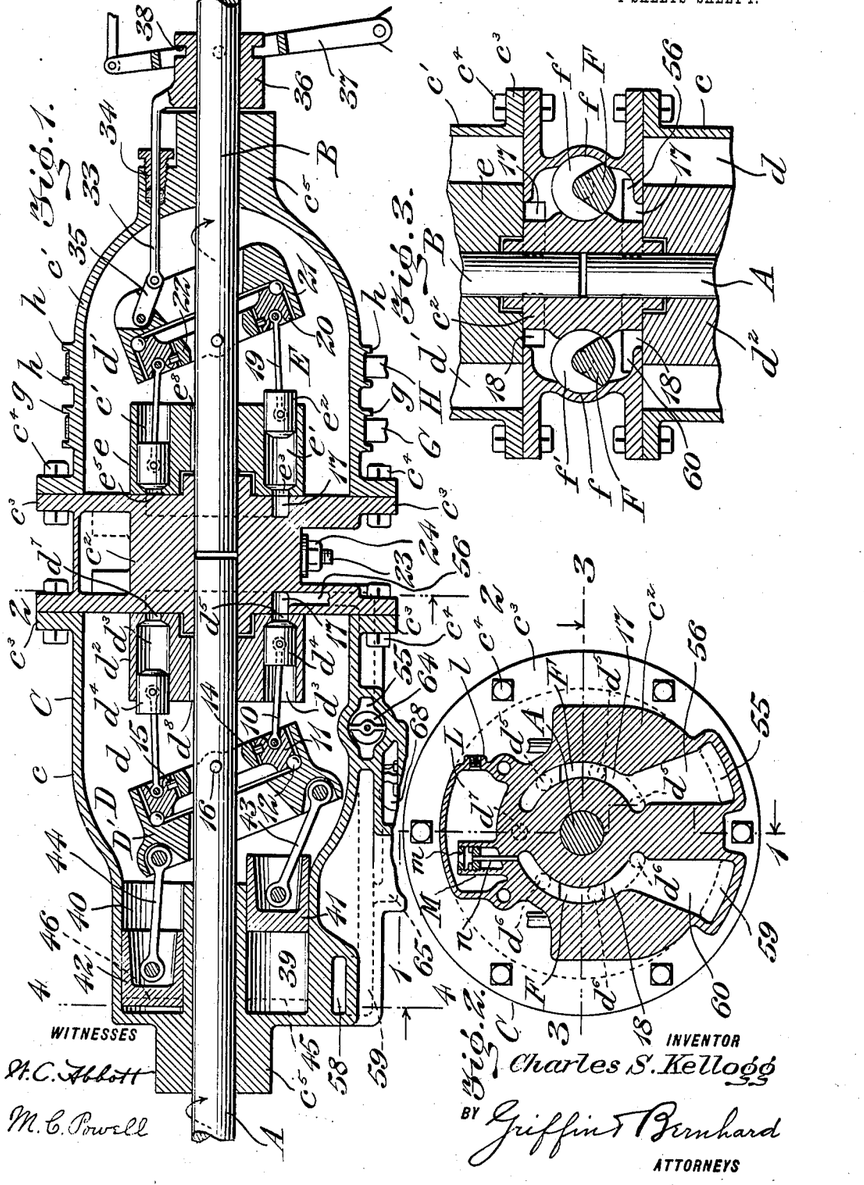
Figure 1 is a vertical longitudinal section through a transmitting apparatus embodying the present invention, the plane of the section being indicated by the irregular line 1—1 of Fig. 2.
Fig. 2 is a vertical cross section on the line 2—2 of Fig. 1.
Fig. 3 is a horizontal detail section illustrating the valve mechanism for controlling the flow of liquid between the pumps, the plane of the section being indicated by the dotted line 3—3 of Fig. 2.
Figure 7:
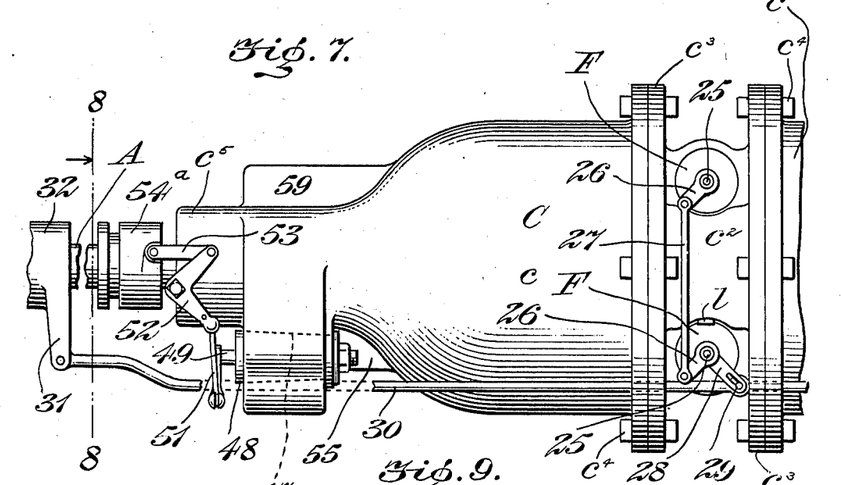
Fig. 7 is a plan view of the left hand portion of the apparatus shown in Fig. 1 illustrating means for operating the several valves.
Figures 8, 9:
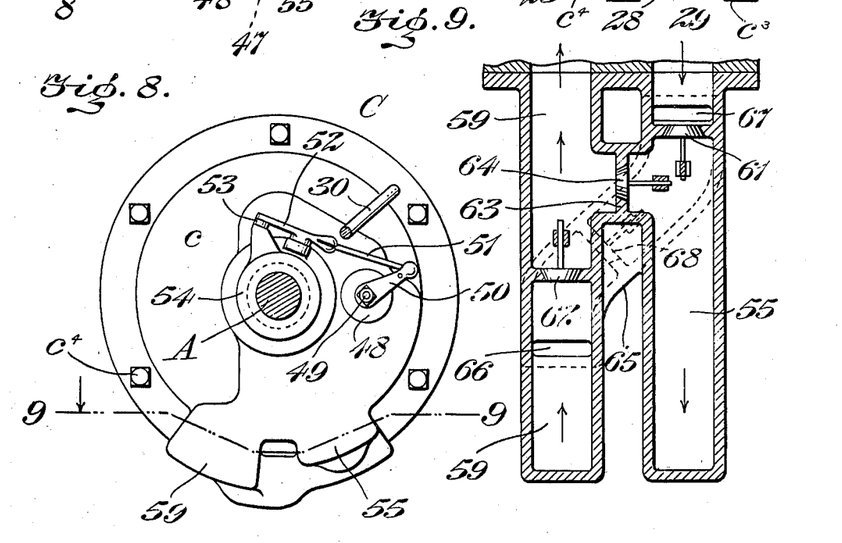
Fig. 8 is a vertical cross sectional elevation, the plane of the section being indicated by the dotted line 8—8 of Fig. 7.
Fig. 9 is a horizontal section on the line 9—9 of Fig. 8 illustrating a part of the fluid regulator used in connection with the fluid operated means for adjusting the pump cam or abutment.

The circulation of the fluid between the pumps and through the liquid circuit formed by the channels 17, 18 and in the head, $c^2$, of the casing, C, takes place when said channels are partly or wholly unobstructed, but for the purpose of controlling and regulating the circulation of the fluid between said pumps, the apparatus is equipped with an appropriate valve mechanism, the latter being operated at will and regardless of the condition of the casing, C, that is to say, the valve mechanism is adapted to be operated either when the casing is at rest or in motion. In Figs. 3, 6 and 7 of the drawings I have shown one form of valve mechanism suitable for the purposes of the present invention, and reference will now be made to said figures in connection with the following description.

The channels 17, 18 are enlarged between two sets of pump chambers, $d^3$ and $e'$, said enlarged portions forming the valve seats, $f$. These valve seats are occupied by the valves, F, and are preferably of the conical form shown in Fig. 6, each valve being provided with a port, $f'$, shown in Fig. 3. As shown in Fig. 6, each valve is provided, furthermore, with a stem 23 held in place by a nut 24, and from the other end of the valve extends a shaft 25. The shafts of the valves are provided with the arms 26, see Fig. 7, and these arms are connected by a link 27, whereby the valves are operated simultaneously. Suitable means are provided for operating the valves by hand or foot power, and as shown in Fig. 7, the rock shaft of one valve is provided in addition to the arm 26 with another arm 28, the free end of which is connected loosely at 29 to an operating rod 30. Said rod extends lengthwise of the apparatus and is guided in suitable openings provided in the rotating casing, C, one end of said rod being connected to a short arm 31 of a sliding collar 32, the latter fitting loosely on one of the shafts, A or B. When the valves are adjusted to the positions shown in Figs. 3 and 7, the solid parts thereof close the channels 17, 18 so as to prevent the fluid from circulating between the two sets of piston chambers of the pumps, D, E, but it is evident that the rod 30 may be operated to open the two valves, F, simultaneously, thus permitting the liquid to circulate from the piston chambers of one pump to the piston chambers of the other pump and vice versa.

Any suitable means may be employed for adjusting the cam or abutment of the pumps, or either of them, and in the drawings, I have shown means for mechanically adjusting one of the pump cams or abutments, and fluid operated means for adjusting the other cam or abutment. The mechanically operated means for this purpose is shown in connection with the cam or abutment 21 of the right hand pump, E, in Fig. 1. Said means consists of a rod 33 which passes loosely through a stuffing box 34, the latter being provided in the closed end portion of the section, $c'$, forming a part of the rotatable casing, C. The inner end of this rod is connected by a link 35 to the abutment or cam 21, whereas the outer part of said rod is attached to a collar 36, the latter being slidable loosely on the driven shaft, B. Said collar may be operated by a lever 37 which is engaged loosely with the grooved part 38.

The fluid operated means for adjusting the pump abutment or cam is represented at the left of Fig. 1 in connection with the pump, D, and is shown also in Figs. 2, 4, 6, 7, 8 and 9 of the drawings. It will be understood, however, that I may employ only one means for adjusting a pump cam or abutment; that said means may be either a mechanically operated device, or a fluid operated device, and that when two pumps are employed, I may employ either of said means for adjusting the cam or abutment of the driving pump, the cam or abutment of the driven pump being fixed with relation to the casing.

Figure 4:
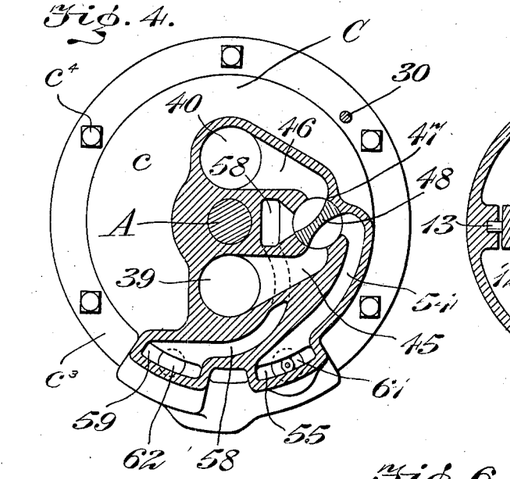
Fig. 4 is a vertical cross section on the line 4—4 of Fig. 1 showing certain parts of the apparatus in elevation.

The closed end portion of the section, c, forming one part of the rotatable casing, C, is provided with the piston chambers 39, 40, in which operate the pistons 41, 42, one of which pistons is connected by a link 43 to the abutment or cam, D′, whereas the other piston is connected by the link 44 to the cam or abutment, D′, said links, 43, 44, being connected pivotally to said abutment at opposite points thereof. From the chambers 39, 40 lead passages 45, 46 which, as shown in Fig. 4, meet at a common point so as to produce a valve seat 47. Said valve seat is occupied by a two-way reversing valve 48 which is preferably of the plug form, and is provided with a stem 49. The valve stem carries an arm 50 to which is pivoted a link 51, the other end of which is connected to one arm of a bell crank lever 52, said lever being in turn connected by a link 53, to a grooved collar 54ᵃ, the latter being slidable on one of the shafts, such as the driving shaft, A, see Figs. 7 and 8. From that part of the valve seat 47 which communicates with the passage 45 leading to the piston chamber 39 extends a cross passage 54, the latter communicating with a longitudinal passage 55 which is on the underside of the section, c, of the casing, C, the forward end of said passage 55 opening into a transverse passage 56 which communicates with the channel 17 of the fluid circuit. From the other side of the valve seat 47 which communicates with the passage 46 leading to the piston chamber 40 extends a passage 58 which extends out of the path of the passage 45 and opens into the longitudinal passage 59, on the underside of the casing, C, see Fig. 4. This passage 59, shown in dotted lines in Fig. 1, extends parallel to the passage 55, and at its other end it connects with the transverse passage 60 which extends upwardly into communication with the channel 18, see Fig. 2. In the passage 55 is seated a check valve 61; in the other passage 59 is seated a check valve 62, arranged to open in an opposite direction to the valve 61; between the passages 55, 59, is a wall 63 having a single port adapted to be closed by a check valve 64, the latter working at right angles to the valves 61, 62, and adapted to be seated by pressure of the fluid in one passage and to be opened by suction or pressure of fluid in the other passage; and connecting the two passages 55, 59, is a by pass passage 65, terminating at its ends in ports 66, 67, which open into the respective passages 55, 59, at points on opposite sides of the valves 61, 62, said by pass having a check valve 68 (see dotted lines in Fig. 9 and full lines in Fig. 1.)

Assuming that the pump, D, is forcing the fluid into the pump, E, that the abutment or cam, D′, is adjusted to the position of Fig. 1, and that the valve 48 is in the position shown in Fig. 4, to block communication of passage 46 with 54, and, also, to block communication of passage 45 with 58, there is maintained in the apparatus a current of liquid under pressure extending from the chamber 17, through the passages 56, 55, 54, 45 and in the chamber 39 so as to exert pressure against the piston 41 for the purpose of retaining the abutment D′ in an inclined operative position. The pressure of the column of liquid acts constantly and substantially uniformly against piston 41 so as to preclude any movement of said piston to the left in Fig. 1, whereby abutment D′ is held against movement under pressure of the series of pump pistons, the pressure of said liquid column acting, also, to hold open check valves 61, 62 and to close the valves 64, 68. At the same time, the fluid is exhausted from the chamber 40 by reason of said chamber being in communication with the channel 18 of the liquid circuit, such communication being established through the passages 46, 58, 59 and 60, whereby the pump, D, operates to maintain a liquid current under pressure in the chamber 39 and to exhaust fluid from the other chamber 40.

For changing the piston of the pump abutment or cam, D′, it is only necessary to adjust the valve 48 of Fig. 4 so as to exhaust fluid from the chamber 39 and force it into the chamber 40, thus reversing the positions of the pistons 41, 42. Such reversal of the valve 48 blocks communication between passage 45 with 54, and, also, the communication of passage 46 with 58, and thereby places the passage 54 into communication with the passage 46 and the passage 45 is made to connect with the passage 58, whereby the column of fluid from one side of the check valve 61 in the passage 55 exerts pressure on the piston 42 in the chamber 40 and the liquid is exhausted from the chamber 39 in which operates the piston 41. Under these conditions the column of liquid is under pressure in channel 18 of the liquid circuit, said column extending, also, through the passages 60, 59 as far as the check valve 62, the pressure closing said valve 62 and opening the valve 64 so that the fluid passes thence to the valve 61 so as to close the latter and pass through a part of the passage 55, thence to the passages 54 and 46 to the chamber 40 for forcing the piston 42 to a reverse position of Fig. 1. At the same time the fluid is exhausted from the cylinder 39 through the passages 45, 58, a part of the passage 59, the port 66, the by pass 65, through the port 67 and thence to the channel 17. From this it will be seen that from the check valve 61 to the reversing valve 48 there is always a column of liquid which exerts its pressure in one direction only for the purpose of moving either of the pistons 41 or 42 according to the position of the valve 48, and this is true regardless of the position of the pump cam or abutment, D', which reverses the action of the pump, D, that is, it makes one channel, 17 the pressure channel and the other channel 18 the exhaust channel in the position of the parts shown in the drawings, but a reversal of the cam or abutment, D', to the opposite inclination of Fig. 1 makes the channel 18 the pressure channel and 17 the exhaust channel. The described mechanism thus provides for retaining the pump cam or abutment in a fixed position relative to the pump barrel by the action of fluid pressure; furthermore, by the adjustment of a simple valve, the position of the cam or abutment may be reversed by the action of fluid under pressure so as to reverse the operation of the pump; and, furthermore, the valve may be manipulated so as to let more or less fluid pass into one or the other of the chambers 39 or 40 so as to move the pistons and the cam or abutment to any required position, whereby the capacity of the pump may be varied by regulating the stroke of the pistons, the volume of the liquid in the liquid column being so controlled by valve 48 that said liquid column will move the abutment to the required position and will thereafter operate to retain said abutment in the position to which it is adjusted or said abutment or cam may be moved to a position perpendicular to the shaft, A, thus practically throwing the pump out of operation by ceasing to impart reciprocating motion to the pistons, $d^4$.

In connection with the rotatory member or casing, C, it is preferred to employ means for holding the same from rotation. Two braking mechanisms are employed for this purpose, one being a brake adapted to be applied at will into frictional engagement with the casing, and the other being an automatic brake adapted to restrain the casing from rotating in a backward direction. The first brake is shown as a band brake, G, confined between flanges, $g$, of the casing, C, and operated by a lever or treadle (not shown), whereby the brake may be applied into frictional engagement with the casing, C, for restraining the latter against rotation in either direction, thus locking said casing in fixed relation to the ground or car. The automatic brake is shown as a band, H, in coöperative relation to the flanges, $h$, on the casing, C, said band being equipped with pivoted shoes, H', see Figs. 10 and 11, which shoes normally occupy such relation to the casing, C, as to be brought into frictional engagement therewith when said casing has a tendency to turn in a backward direction, under certain conditions of use. These shoes, H', are so mounted on the brake band that they permit the casing, C, to turn without restraint in a forward direction, but the brake band, H, and its shoes, H', may be moved out of coöperative relation to the casing, C, by expanding the band, H, to such diameter that the shoes, H', cannot engage therewith, such expansion of the brake band being accomplished at will by suitable mechanical appliances.

Figures 10, 11:
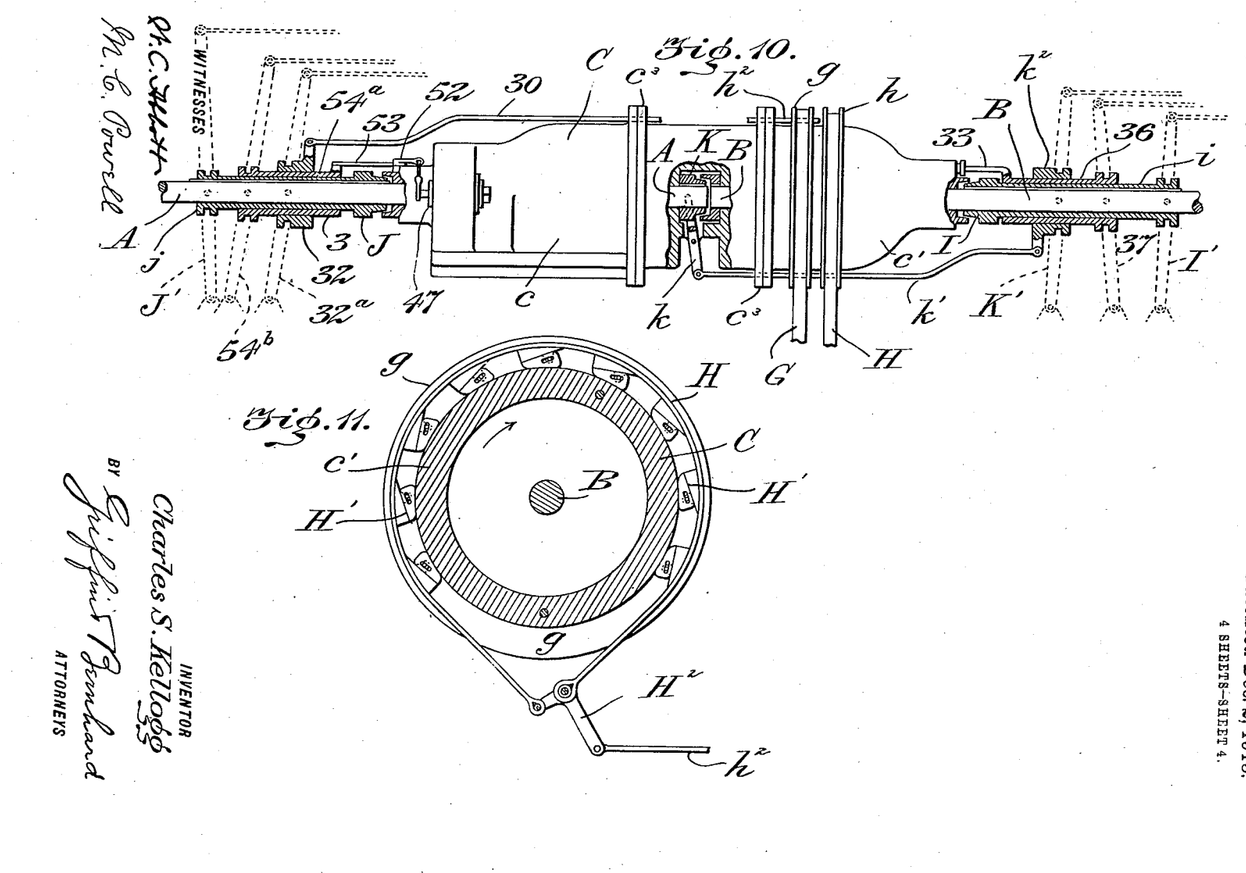
Fig. 10 is an elevation, partly in section, showing the apparatus equipped with a plurality of brake mechanisms.
Fig. 11 is a cross section showing one form of an automatic brake which, however, is releasable at will.

For direct drive of the apparatus, i. e. when the shafts, A, B, rotate at the same speed to utilize the full power of the engine, it is preferred to employ means for causing the several mechanisms to rotate as a unit, thus relaxing pressure on the liquid and minimizing leakage. It is well known that automobiles are driven about 90 per cent. of the time they are in use on direct drive, hence an important part of the invention is the rotatory casing, C, and means whereby said casing is adapted to rotate as a unit with the shafts, A, B. Such result is secured, if desired, by closing the valves, F, to arrest the circulation of liquid in the circuit, so that the casing, C, the pump, E, and the shaft, B, are rotated with the shaft, A, at the speed of the latter; but under such conditions, the liquid is placed under pressure and is liable to leak, hence I make provision for mechanically coupling the parts, in order to relax the liquid pressure. The result sought after may be secured in a variety of ways; first, by coupling the casing, C, to the shafts, A, B, and, second, by coupling the shafts, A, B, directly to each other. In Fig. 10, the clutches, I, J, are mounted near the end portions of the drum so as to engage with the shafts, A, B, respectively. These clutches may be of any suitable construction, and they may be operated independently or conjointly, as desired, by suitable shipping levers. Again, the clutch, K, may be mounted on the end portion of one of the shafts, as A, and this clutch is adjusted by an appropriate shipper rod into engagement with the shaft, B, thus making the shafts, A, B, fast together for rotation at one speed or releasing them for rotation at different speeds.

In the operation of the apparatus, the casing, C, contains a certain amount of liquid, while the liquid circuit, including the pump cylinders, and the fluid pressure means for adjusting the pump cams and abutments are charged or filled with liquid. A certain amount of fluid leaks from the pumps, however, and to replace this leakage, means are provided for automatically supplying the fluid to the liquid circuit so as to keep the latter charged or filled. In Figs. 1 and 2, the head, $c^2$, is shown as having a reservoir chamber, L, the latter being provided with a valved filling port, 1. In said chamber, L, is a tube, M, having a perforated valve or head, $m$, and below this head is a passage, $n$, which leads through the head, $c^2$, to one of the channels 18 of the liquid circuit. The chamber, L, contains a certain amount of liquid, and when there is appreciable loss of liquid in the exhaust channel 18 of the liquid circuit, the liquid may pass from the chamber, L, past the valve or head, $m$, and through the passage, $n$, into the liquid circuit.

The operation of the apparatus, so far as concerns many of the features thereof, will be readily understood from the foregoing description, but reference will now be made to some of the advantages which are of particular importance when the mechanism is used in connection with an automobile.

It frequently happens that the engine is in full operation, while the car is at rest. Under such conditions, the driving pump of the transmission mechanism may be thrown out of service by adjusting the pump cam or abutment, D', to a plane at right angles to the shaft, A, or the driven pump may in like manner be thrown out of service by adjusting cam 21; or both pumps may be in use by adjusting the cams or abutments to inclined positions (at different angles to their respective shafts), in which case the liquid is forced to circulate. Assuming that the controlling valves, F, are wide open, that the abutment 21 of the driven pump is in an inclined position, and that abutment, D', is less inclined (thereby giving it a relatively less pumping capacity), but otherwise positioned as in Fig. 1, and that the brakes, G, H, are both released from the casing, the liquid is forced through the channels 17, 18 of the head, $c^2$, and the pump barrels of the pumps, D, E, and acts to impart rotary motion to the casing, C, such rotation of the casing being in an opposite direction to that of the shaft, A, and the member 11 of the pump abutment; the parts, D', 21, rotating with said casing, and the circulation of the liquid exerting no appreciable torque on the driven shaft, B, so that the car remains stationary. It will thus be seen that when the car is at rest, and the parts adjusted as described, the engine and the driven pump, D, are free to operate, but the drum or casing, C, being loosely mounted with respect to both shafts, will rotate in an opposite direction to that of the driving shaft. If desired, however, the small amount of torque applied under such conditions may be practically eliminated by decreasing the liquid discharge of the pump or pumps attached to shaft, A, or eliminating the stroke of the pump attached to shaft, B. When, however, the cams are set at opposite inclinations with respect to the casing, or the driving pump is adjusted for greater pumping capacity than the driven pump, said casing will go forward. When the car is stationary and both cams properly inclined, the cam of the driving, however, being set at a greater inclination than the cam of the driven shaft, the casing will revolve backward; but, when the mechanism is adjusted to back, the casing will revolve forward. Furthermore, when the mechanism is set to go forward, but the driving pump adjusted to pump more liquid than the driven pump, the casing will go forward.

For starting the car forward without jarring and jolting, the engine, pump, D, and casing, C, running as described, the operation consists in gradually applying the brake, G, or gradually closing the valves, F, in the liquid circuit, or both operations may be performed simultaneously. The application of said brake to the casing, C, reduces the speed of said casing, or arrests the motion thereof, (the abutment 21 becoming fixed) so as to eliminate the liquid slip in the circuit 17, 18; and the liquid is thus forced through the circuit and through the piston chambers of the driven pump, E, thus transmitting its power to shaft, B. The partial closing of the valves, F, retards or impedes the full and free circulation of the liquid through the circuit and the pump, E, and the liquid is thus "choked" in the liquid passages, the result being that the torque exerted by the pump, E, on the driven shaft, B, is increased and the casing or drum, C, is caused to rotate, at reduced backward speed, or in the same direction as the engine shaft; it being understood that the brake or brakes are released from said casing, and that the car is to be moved in a forward direction. The pump, D, now operates (the cams, D', 21 being both inclined to the positions of Fig. 1, D' being at a less variation to a right angle than 21) to force the liquid through the channel 17 and to exhaust it through the channel 18, whereupon the pump, E, operated by the pressure of the circulating liquid, imparts rotary motion to shaft, B, in the same direction as that of shaft, A. The speed of shaft, B, however, is less than that of shaft, A, the reason being that the power exerted by the engine shaft, A, is divided, a part of said power being utilized to drive the rotary casing, which carries abutment 21, and the remainder operating to propel the pump, E, faster than the casing. The car may thus be started without undue jar or jolt and with little or no strain on the parts of the car. The reason, more specifically stated, why the speed of the driven shaft, B, is less than that of the driving or engine shaft, A, is because of the shorter stroke of the piston of the driven pump, or because of the backward rotation of the casing, according to conditions of operation. The speed of the driven shaft may be regulated, however, by adjusting the valves, F, or by increasing the pumping capacity of the driving pumps. When the car is running with the valves, F, partly closed, the speed may be varied by shifting the pump cams, D, or 21 to vary the relative strokes of the pistons of the pumps, D or E. Then, again, the valves, F, may be still further closed, thereby impeding the liquid circulation to a greater degree, with the result that the speed of the pumps, D and E, is reduced, with respect to the casing, and the speed of the casing increased, the speed of the driven shaft being thereby increased but with reduced torque. The apparatus is thus under the complete control of the operator, and it may be easily regulated to vary the speed of the driven shaft relative to that of the driving shaft at any point between slow speed up to the full speed of the engine shaft or at greater speed.

To cause the driven shaft, B, to rotate at higher speed than the driving shaft, A, the casing, C, must be held against forward rotation, and the capacity of pump, D, increased above that of pump, E. In the various manipulations of the apparatus, the casing, C, may, under some circumstances, tend to rotate backward; but this tendency may be overcome by adjusting the automatic brake, H, to such position that its shoes act to automatically oppose any backward motion, but leave the casing free to rotate in a forward direction.

The driving of shafts, A and B, at the same speed without internal relative movement of the parts, thereby causing all parts to revolve as a unit, may be accomplished in a variety of ways. One method is to close the valves, F, thereby stopping the passage of liquid therethrough, whereupon the casing, C, is driven from shaft, A, and pump, D, and, in turn, said casing drives pump, E, and shaft, B. The operation just described, however, keeps the liquid under pressure, and, in order to relax this pressure, the shafts, A, B, may either be coupled together, by the central clutch, (shown in Fig. 10), or be coupled to the casing or drum, C, by the end clutches, (shown, also, in Fig. 10). In these modes of operation the casing, C, rotates with the shafts, A and B, the said shafts, with the entire apparatus, rotating as a unit. The coupling of either shaft, A or B, to the casing will accomplish direct drive, but without relieving the pressure on the liquid. In accomplishing direct drive, the valves, F, may be closed, gradually, until the full speed is attained, and casing and shafts rotate as a unit, whereupon the clutch or clutches are operated, whereby the union of the two shafts, A, B, is effected without jolting or strain.

As premised in this description, the invention is adapted to be used as a reverse gear, or for propelling the car in a backward direction. To secure this result, the casing or drum, C, is held against rotation by applying the brake, G, thereto, and by reversing the position of the cam or abutment in either the driving pump, D, or the driven pump, E, in other words, arranging said abutments in such manner that the liquid supplied by pump, E, will cause the shaft, B, to rotate in opposite direction to shaft, A. Should this adjustment involve the positioning of cam 21 as shown in Fig. 1, but reversing the position of cam, D', then the circulation of the liquid, being reversed, will be from pump, D, through passage 18, thence through pump, E, back to pump, D, through passage 17.

It will be apparent from the foregoing description that when the apparatus is operated so as to secure a variable speed between the engine shaft, A, and the driven shaft, B, the casing being held against backward rotation by the brakes, the power of said driving shaft, A, is transmitted to the driven shaft, B, with variable speeds and torques, dependent upon the adustment of the relative capacities of the pumps, D and E, valves, F, and brakes, G and H.

It is often advantageous to have the shaft, A, rotate at any speed without exerting appreciable torque on the shaft, B. This is accomplished by "slip," and in either of the following ways, or by a combination of them, the casing being left free to rotate. The cam, D', may be set at a right angle to the shaft, A, whereby the rotation thereof will not cause any action of the pistons, and accordingly, no pumping of liquid. The cam 21 may be set at right angles to the shaft, B, so that the rotation of the casing and the pump parts attached to it and to the shaft, A, and the liquid pressures will in no wise tend to rotation of part 20 and the shaft, B. The casing being free to rotate, even if both cams, D', and 21 be set at angles other than right angles to their respective shafts, the only torque imparted to shaft, B, would be that necessary to rotate the casing which would rotate in the direction of least resistance.

In case of the operation of the mechanism in such a manner that the speed of shaft, B, shall not exceed the speed of shaft, A, the case may or may not be held still with respect to either the shaft or the machine. For convenience we will call this normal operation. When greater speed is desired in shaft, B, than in shaft, A, the casing must be held still with respect to the machine and the cam 21 must be nearer at a right angle to shaft, B, than cam D', is to shaft, A. That is to say, one revolution of shaft, A, should move more liquid through the circuit than would be necessary to produce one revolution of shaft, B.

While reference has been made to several methods of operating the mechanism, whereby useful and important results are secured, yet it will be apparent to those skilled in the art that said mechanism may be manipulated in various other ways to meet the many conditions which arise in running automobiles. Reference will be made, however, to the utilization of the mechanism as a brake.

In using the mechanism as a positive brake, the casing must be held against rotation. Shaft, B, being then driven by the momentum of the car, the amount of liquid which its pump, E, can pump through the stationary liquid circuit, during a given time, will determine the speed at which said shaft, B, rotates. By partly or wholly closing the liquid circuit, by means of valves, F, the shaft, B, can be either stopped or its speed controlled. If cam, D', is positioned at right angles to shaft, A, said shaft may be allowed to continue its free rotation, while shaft, B, is held fixed. It will be observed that the same result may be secured, without the use of valves, F, by the adjustment of cam, D', as aforesaid, but with undesirably high-speeds of engine shaft, A, before the cam, D', reaches the position at right angles to shaft, A. It will be observed, moreover, that without using the brake, or the valves, F, the compression of the engine may be availed of to retard the car, as is common practice with numerous forms of transmission mechanism now in use.

It will be understood that no attempt has been made in the foregoing specification to describe all the uses and advantages of the invention; and, further, that I do not intend to restrict myself to the specific forms of pumps, valves, etc., shown and described, but claim the right to substitute equivalent devices for any or all parts of the mechanism.

Having thus fully described the invention, what I claim as new, and desire to secure by Letters Patent is:

1. In an apparatus of the class described, a rotatable member provided with a liquid circuit, reciprocating pumps in coöperative relation to said circuit, driving and driven members coöperating with said pumps, and means for controlling the rotation of said circuit carrying member whereby it may rotate with said driving and driven members, or the pumps may be operated to drive one member from the other member.

2. In an apparatus of the class described, driving and driven members, reciprocating pumps coöperating therewith, a chambered rotatable member, independent of said driving and driven members, provided with a liquid circuit which coöperates with said pumps, and means for controlling the circulation of liquid in said circuit, whereby the pumps are adapted to transmit the motion of one member to the other at variable speeds or the chambered rotatable member may be caused to rotate with both members at substantially the maximum speed of the driving member.

3. In an apparatus of the class described, a rotatable drum or casing provided with a liquid circuit, driving and driven members independent of said rotatable drum or casing, a multiple reciprocating piston pump coöperating with the driving member and the liquid circuit, a separate multiple reciprocating piston pump operating to drive the driven member and also coöperating with the liquid circuit, means operated at will for controlling the rotation of said drum or casing, and separate means for varying the capacity of either of said pumps.

4. In an apparatus of the class described, driving and driven members, a rotatable casing provided with a member intermediate its ends, said casing being independent of said driving and driven members, a liquid circuit in said member of the rotatable casing, pumps coöperating with the liquid circuit in said intermediate member of the casing, one of said pumps being operated by the driving member and the other pump coöperating with the driven member, and means for controlling the circulation of liquid in said circuit.

5. In an apparatus of the class described, a rotatable drum or casing provided with a member intermediate its ends, a liquid circuit in said member, driving and driven members, pumps incased in said drum or casing and coöperating with the liquid circuit in said intermediate member, means for regulating the circulation of liquid in said circuit, and means for arresting the rotation of said casing.

6. In an apparatus of the class described, driving and driven members, a casing provided with a member intermediate its ends, said casing being independent of the driving and driven members and adapted to rotate therewith or to rotate independently of either of them, a liquid circuit in the intermediate member of said casing, a driving liquid pump operated by said driving member, a liquid driven pump coöperating with the driven member, both of said pumps being in coöperative relation, also, with said liquid circuit, and means for opening and closing said liquid circuit, whereby liquid may be locked in the apparatus, and the casing with the pumps caused to rotate as a unit with the driving and driven members.

7. In an apparatus of the class described, a rotatable drum or casing provided with a member intermediate its ends, a liquid circuit in said member, driving and driven members, pumps incased in said drum or casing and coöperating with the liquid circuit in said intermediate member, means for controlling the circulation in said circuit, and independent means whereby the apparatus may be caused to rotate as a unit and the liquid released from pressure.

8. In an apparatus of the class described, a rotatable drum or casing provided with a member intermediate its ends, a liquid circuit in said member, driving and driven members, pumps incased in said drum or casing and coöperating with the liquid circuit in said intermediate member, means for controlling the circulation in said circuit, and coupling means independent of the liquid controlling means for making the pumps and the casing rotate as a unit with said driving and driven members.

9. In an apparatus of the class described, a rotatable drum or casing provided with a transverse head intermediate its ends, a liquid circuit in said head, driving and driven shafts, reciprocating pumps incased in said drum or casing, each pump coöperating with one of said shafts and with the liquid circuit, and valve mechanism carried by said head for controlling the circulation of liquid in said circuit.

10. In an apparatus of the class described, a rotatable drum or casing provided with a liquid circuit intermediate of its ends, valve mechanism intercepting the liquid circuit, driving and driven shafts, and reciprocating pumps in said drum or casing, each coöperating with one of said shafts and with said circuit.

11. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and brake mechanism coöperating with said casing.

12. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and an automatic brake coöperating with said casing.

13. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and an automatic brake coöperating with said casing, said automatic brake tending to restrain the casing from rotating in one direction and being releasable at will from said casing.

14. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and brake mechanism operatable at will for locking said casing from rotation.

15. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and clutch mechanism whereby said drum or casing is adapted for unitary rotation with said shafts.

16. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and clutch mechanism for directly coupling said shafts.

17. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and clutch mechanism for coupling the casing to the shafts.

18. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and a plurality of clutches whereby the shafts may be coupled directly and the casing coupled to said shafts.

19. In an apparatus of the class described, a rotatable drum or casing provided with a liquid circuit intermediate of its ends, valve mechanism intercepting the liquid circuit, driving and driven shafts, reciprocating pumps each coöperating with one of said shafts and with said circuit, and a plurality of brake devices coöperating with said casing or drum, one of said brake devices being operated at will, and another of said brake devices operating automatically to hold said casing from rotation in one direction.

20. In an apparatus of the class described, a casing or drum provided with a liquid circuit intermediate its ends, driving and driven shafts, reciprocating pumps each coöperating with one shaft and with said circuit, one of said pumps having a shiftable cam or abutment, and fluid operated means for changing the position of said shiftable cam or abutment.

21. In an apparatus of the class described, a casing or drum provided with a liquid circuit intermediate its ends, driving and driven shafts, reciprocating pumps each coöperating with one shaft and with said circuit, one of said pumps having a shiftable cam or abutment, and means operated by a column of fluid held under pressure by one of said pumps for changing the position of said shiftable cam or abutment.

22. In an apparatus of the class described, a reciprocating piston pump having a shiftable cam or abutment whereby the pump may be reversed, means operated by a column of fluid under pressure for changing the position of said cam or abutment, and regulating means tending to normally maintain the liquid column in a condition to exert its pressure in a given direction irrespective of the direction in which the pump is operating to force a liquid.

23. In an apparatus of the class described, a casing having pressure and exhaust channels, multiple piston pumps coöperating with said channels, one of said pumps having a shiftable cam or abutment, fluid operated means connected with said cam or abutment, means whereby a column of liquid is maintained between the channels and said fluid operated means, and valve mechanism for directing the column of liquid to change the position of said cam or abutment.

24. In an apparatus of the class described, a drum or casing provided with a liquid circuit intermediate its ends, driving and driven shafts, multiple piston pumps incased by said drum and each coöperating with said circuit and one of said shafts, one of said pumps having a shiftable cam or abutment, means for changing the position of the cam or abutment, and means for controlling the circulation of liquid in said circuit, the aforesaid drum or casing being free to rotate with respect to either of said shafts and also capable of unitary rotation with both of said shafts.

25. In an apparatus of the class described, driving and driven members, a casing or drum free to rotate with respect to either of said members and capable of unitary rotation therewith, a reciprocating piston pump coöperating with the driving member and the casing and a reciprocating piston pump coöperating with the driven member and the casing for communicating the motion of one member to the other member, one of said pumps having means controllable at will for reversing its action, and means for controlling the rotation of said drum or casing whereby it may be driven by one member to impart motion to the other member at a speed corresponding to that of the driving member.

26. In an apparatus of the class described, driving and driven members, a casing or drum free to rotate with respect to either of said members and capable of unitary rotation therewith, means incased by the drum for transmitting motion, at reduced speed, from one member to the other member, said transmitting means being adapted to vary the relative speeds of the two members, and means for controlling the rotation of said drum or casing whereby it may be caused to rotate with one or both of said members.

27. In an apparatus of the class described, driving and driven shafts, a casing or drum supported for rotation with respect to said shafts, a reciprocating piston pump coöperating with the driving shaft and with the casing, and a reciprocating piston pump coöperating with said driven shaft and the casing for communicating the motion of one shaft, at a reduced speed, to the other shaft, one of said pumps having means controllable at will for reversing its action, and said casing being adapted to rotate relative to both of said shafts while one of them is at rest, and means for securing unitary rotation of said casing or drum with said shafts and at approximately the speed thereof.

28. In an apparatus of the class described, driving and driven shafts, a casing or drum supported for rotation relative to said shafts, a reciprocating piston pump coöperating with the driving shaft and the casing or drum and another reciprocating piston pump coöperating with the driven shaft and said casing or drum, whereby the motion of the driving shaft may be transmitted, at a reduced speed, to the driven shaft, means whereby the efficiency of the aforesaid transmitting means may be increased or decreased to vary the speed of the driven shaft relative to the driving shaft, and means whereby the rotation of the casing or drum may be controlled, or said drum may be caused to have unitary rotation with said shafts.

29. In an apparatus of the class described, a rotatable drum or casing provided with a member intermediate its ends, a liquid circuit in said member, driving and driven members, pumping mechanism coöperating with the liquid circuit in said intermediate member, means for regulating the circulation of liquid in said circuit, and means for arresting the rotation of said casing.

30. In an apparatus of the class described, a rotatable drum or casing provided with a member intermediate its ends, a liquid circuit in said member, driving and driven members, pumping mechanism coöperating with the liquid circuit in said intermediate member, means for controlling the circulation in said circuit, and independent means whereby the apparatus may be caused to rotate as a unit and the liquid released from pressure.

31. In an apparatus of the class described, a rotatable drum or casing provided with a liquid circuit intermediate of its ends, driving and driven members, reciprocating pumps each coöperating with one of said members and with said circuit, brake mechanism operative to restrain, or to control, the rotation of the casing, and means, separate from the liquid circuit, to cause all parts of the mechanism to rotate as a unit.

32. In an apparatus of the class described, driving and driven members, a casing or drum free to rotate with respect to either of said members and capable of unitary rotation therewith, a reciprocating piston pump coöperating with the driving member and with said casing or drum and another reciprocating piston pump coöperating with the driven member and said casing or drum for transmitting motion, at reduced speed, from one member to the other member, one of said pumps having means adapted to vary the relative speeds of the two members and operating also to reverse the direction of said pump, and means for controlling the direction and speed of rotation of said casing or drum, or for restraining it against rotation.

33. In an apparatus of the class described, driving and driven members, a pump coöperating with one member, said pump having means for varying its pumping capacity, another pump coöperating with the other member, a casing independent of said members and rotatable with respect thereto, and means for controlling the rotation of said casing.

34. In an apparatus of the class described, driving and driven members, a pump coöperating with one member, another pump coöperating with the other member, said second pump having associated therewith means for varying its pumping capacity, a casing independent of said members and rotatable with respect thereto, and means for controlling the rotation of said casing.

35. In an apparatus of the class described, driving and driven members, a pump coöperating with one member, another pump coöperating with the other member, each pump having means associated therewith for varying the pumping capacity thereof independently of the other pump, a casing independent of said members and rotatable therewith, and means for controlling the rotation of said casing.

36. In an apparatus of the class described, driving and driven members, two coöperating pump structures the inlet and exhaust ports of which are in a member directly between said pump structures, a casing independent of said pump structures and rotatable with respect thereto, means for controlling the rotation of said casing, and means for controlling the flow of liquid from one pump structure to the other pump structure.

37. In an apparatus of the class described, driving and driven members, two coöperating pump structures, the inlet and exhaust ports of which are in a member positioned directly between said pumps, valve mechanism for controlling the flow of liquid through said ports, a casing independent of the members and rotatable with respect thereto, and means for controlling the rotation of said casing.

38. In an apparatus of the class described, driving and driven members, two coöperating pump structures, the inlet and exhaust ports of which are in a member positioned directly between said pumps, valve mechanism for controlling the flow of liquid through said ports, a casing independent of the members and rotatable with respect thereto, the brake mechanism for locking said casing against rotation in either direction.

39. In an apparatus of the class described, driving and driven members, two coöperating pump structures, the inlet and exhaust ports of which are in a member positioned directly between said pumps, a casing independent of said members and rotatable with respect thereto, valve mechanism carried by the casing and adapted for controlling the flow of liquid through the ports of the two pumps, and means for controlling the rotation of said casing.

In testimony whereof I have signed my name to this specification in the presence of two subscribing witnesses.

CHARLES SNOW KELLOGG.

Witnesses:
JAS. H. GRIFFIN,
H. I. BERNHARD.